United States Patent [19]
Burroughs et al.

[11] Patent Number: 5,078,624
[45] Date of Patent: Jan. 7, 1992

[54] DIGITAL SIGNAL CROSS-CONNECT MODULE

[75] Inventors: Dennis M. Burroughs, Savage; Edward F. Sansone, Coon Rapids; Steven P. Trebesch, Eagan; Daniel Rivera, Sr., St. Louis Park; Ronald G. Butler, Oakdale; Glenn N. Thorgrimson, Minneapolis, all of Minn.

[73] Assignee: ADC Telecommunications, Inc., Minneapolis, Minn.

[21] Appl. No.: 706,392

[22] Filed: May 28, 1991

[51] Int. Cl.⁵ .................................. H01R 13/00
[52] U.S. Cl. .................................... 439/668
[58] Field of Search .................. 439/668, 682–685, 439/692–697

[56] References Cited

U.S. PATENT DOCUMENTS

| | | | |
|---|---|---|---|
| 4,423,466 | 12/1983 | Beun | 439/668 |
| 4,797,114 | 1/1989 | Lau | 439/668 |
| 4,861,281 | 8/1989 | Warner | 439/668 |
| 4,975,087 | 12/1990 | Williams et al. | 439/668 |

Primary Examiner—Joseph H. McGlynn
Attorney, Agent, or Firm—Merchant, Gould, Smith, Edell, Welter & Schmidt

[57] ABSTRACT

A high density digital signal cross-connect module is disclosed. A plurality of jacks are carried on the module and disposed with jack sleeves being in generally horizontal aligned positions. The jacks are disposed in a vertical column in side-by-side relation. The orientation of the jacks permits a higher DSX density in the module.

12 Claims, 5 Drawing Sheets

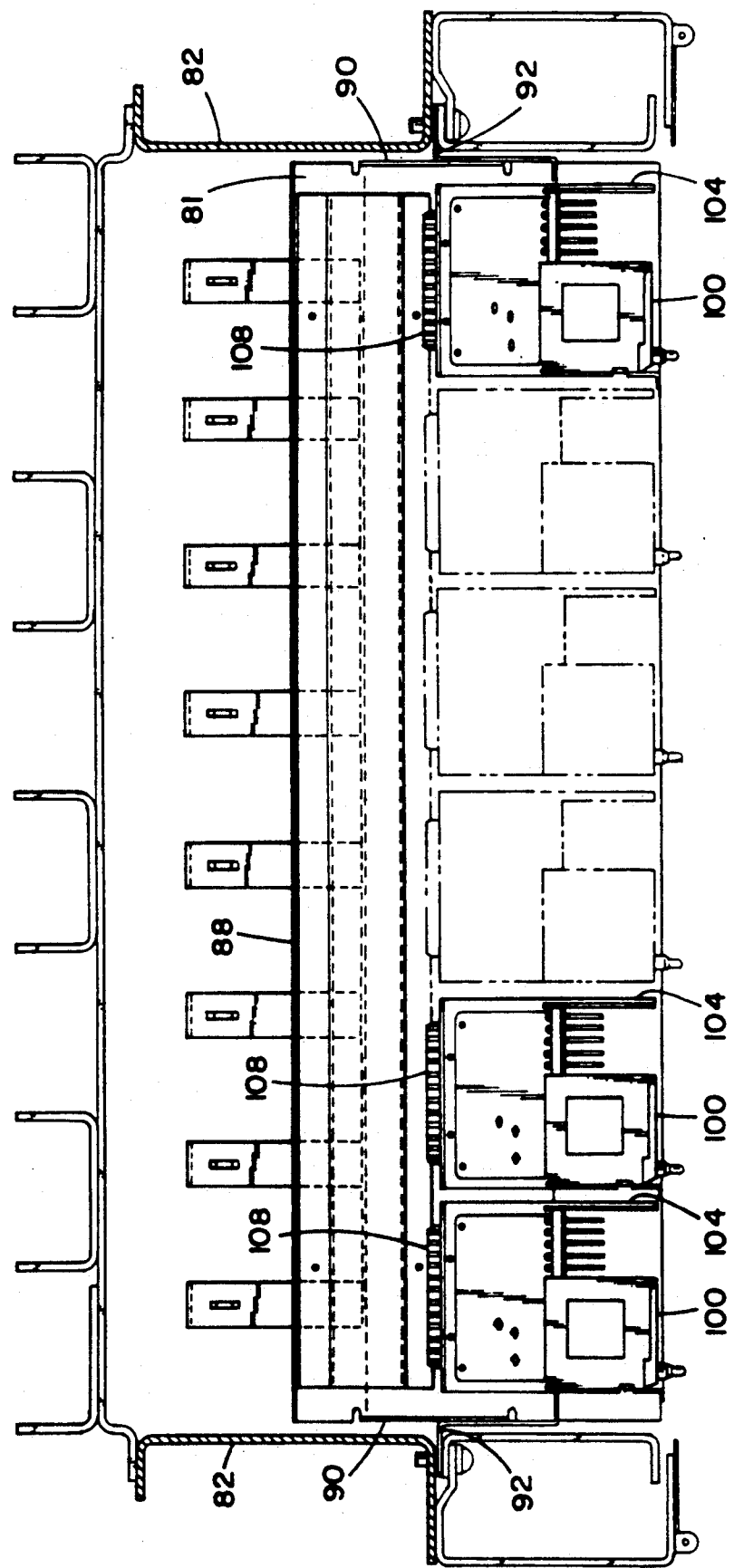

DIGITAL SIGNAL CROSS-CONNECT MODULE

BACKGROUND OF THE INVENTION

1. Field of the Invention

This invention pertains to a digital signal crossconnect module. More particularly, this invention pertains to such a module having means for providing increased density.

2. Background of the Invention

Digital signal cross-connect modules are well known in the telecommunications industry. Examples of such may be found in the product literature of ADC Telecommunications entitled "DSX-1 Digital Cross-Connect 3rd Edition" (1990). For example, page 15 of that product literature shows a front cross-connect module having a jack field located at the top of the module. A cross-connect field is located beneath the jack field. The back of the module is provided with wire wrap termination pins for equipment connections. Page 14 of the same literature shows a front cross-connect module with a cross-connect field located on a side of the jack field. Pages 22 and 23 of the product literature show rear cross-connect modules where the cross-connect fields are located on the rear of the modules along with equipment connection fields.

The cross-connect modules shown in the aforementioned ADC product literature show bantam jacks arranged vertically. (By "vertical", it is meant that the IN and OUT ports of the bantam jack are aligned along a vertical axis of alignment.) The jacks are stacked side-by-side in a horizontal row. This configuration provided for a common module having 64 jacks. The number of jacks contained within a module is commonly known as the "density" of the module. For practical matters, the size of a module cannot be increased since modules are designed to be received within existing frames. Resizing a module would require a heavy capital investment in resizing frames.

U.S. Pat. No. 4,975,087 addresses the prior art problem of restricting the density of a DSX module to 64 circuits. The aforesaid U.S. Pat. No. 4,975,087 recognized the desire to increase the module density to 84 circuits per module. The desire for 84 circuits is attributable to the fact that many types of telecommunications equipment may require 28 jacks. Accordingly, if three pieces of equipment were being terminated, one full prior art modules would be required and a fraction of one prior art module would be required. With 84 circuits, three pieces of equipment could be terminated on a single module.

The aforesaid U.S. Pat. No. 4,975,087 attempts to increase density by providing flats or reduced thickness areas on the sides of the bantam jacks in order to permit compression of the horizontal row of bantam jacks.

It is an object of the present invention to provide a digital signal cross-connect module having enhanced bantam jack density.

II. SUMMARY OF THE INVENTION

According to a preferred embodiment of the present invention, a high density digital signal cross-connect ("DSX") module is provided. The module has a housing with a forward wall. A plurality of jacks has at least first and second spaced apart jack plug receiving sleeves. The jacks further include a plurality of spring contacts disposed to be engaged by a plug inserted into either of the first and second sleeves. Mounting means are provided for mounting the plurality of jacks within the housing with the jacks disposed for the sleeves to be exposed through the forward wall and with the jacks further disposed for the first and second sleeves of any given jack to be in alignment with the horizontal axis.

III. BRIEF DESCRIPTION OF THE DRAWINGS

FIG. 5 is a top sectional view of the module of FIG. 4.

IV. DESCRIPTION OF THE PREFERRED EMBODIMENT

Figure 3:
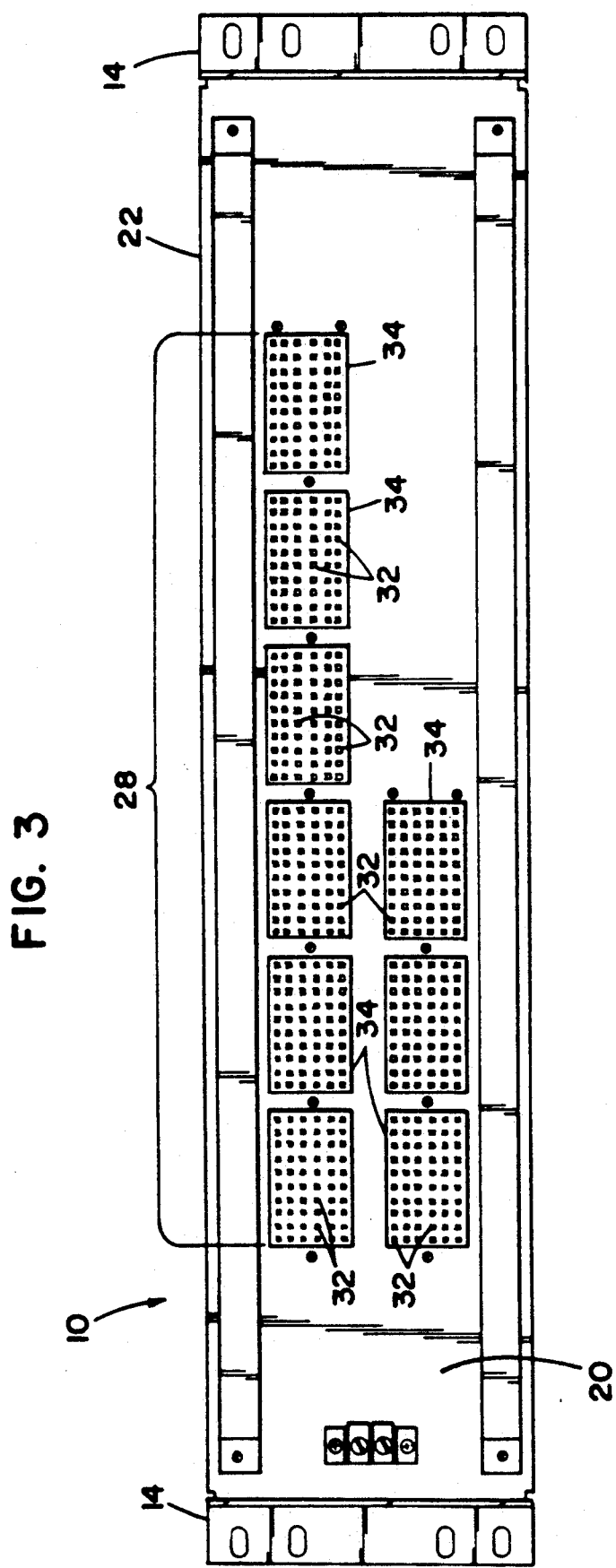
FIG. 3 is a rear elevation view of the module of FIG. 1.

With initial reference to FIGS. 114 3, a high density digital cross-connect ("DSX") module 10 is shown. The module 10 includes a housing 12 having mounting brackets 14 disposed on opposite sides of the housing 12. Mounting brackets 14 are adapted to be releasably received on a frame (not shown) for the longitudinal dimension of the housing 12 (i.e., the distance between mounting brackets 14) to be disposed in alignment with a horizontal axis.

Figure 1:
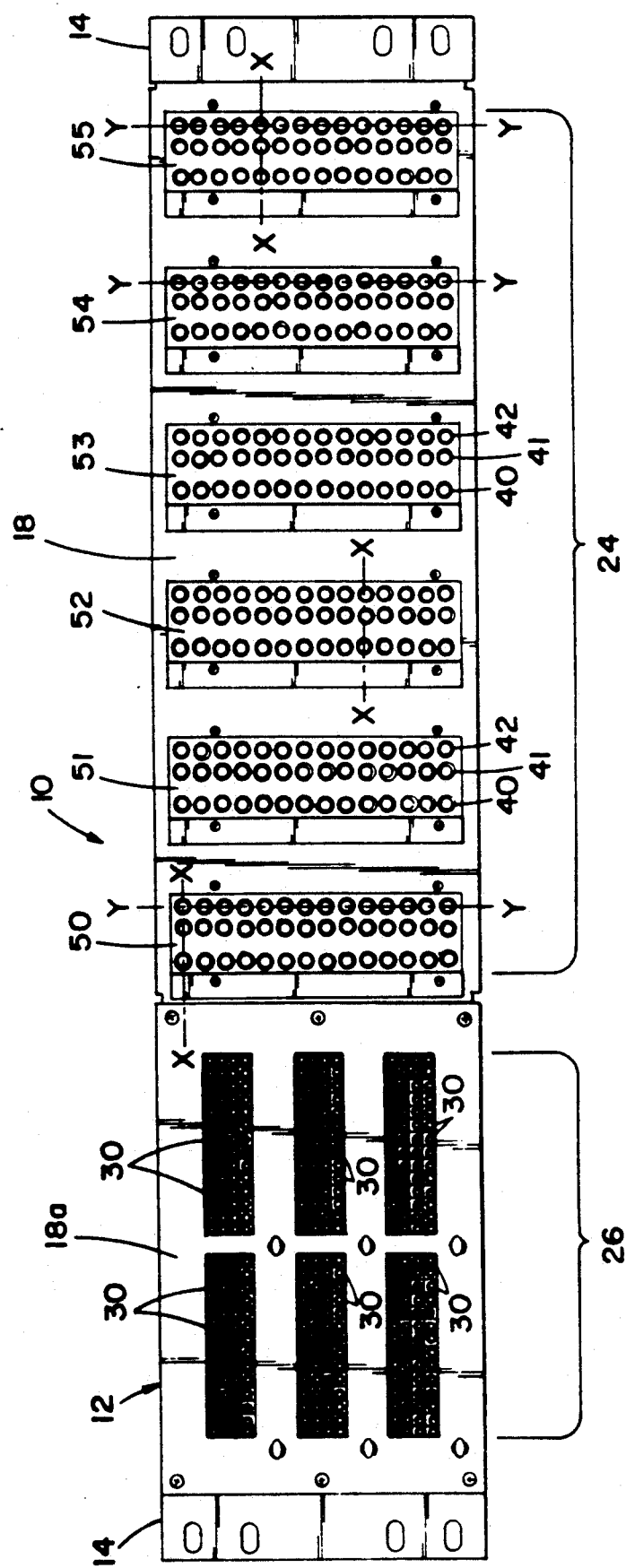
FIG. 1 is a front elevation view of a digital signal cross-connect module according to the present invention.
Figure 2:
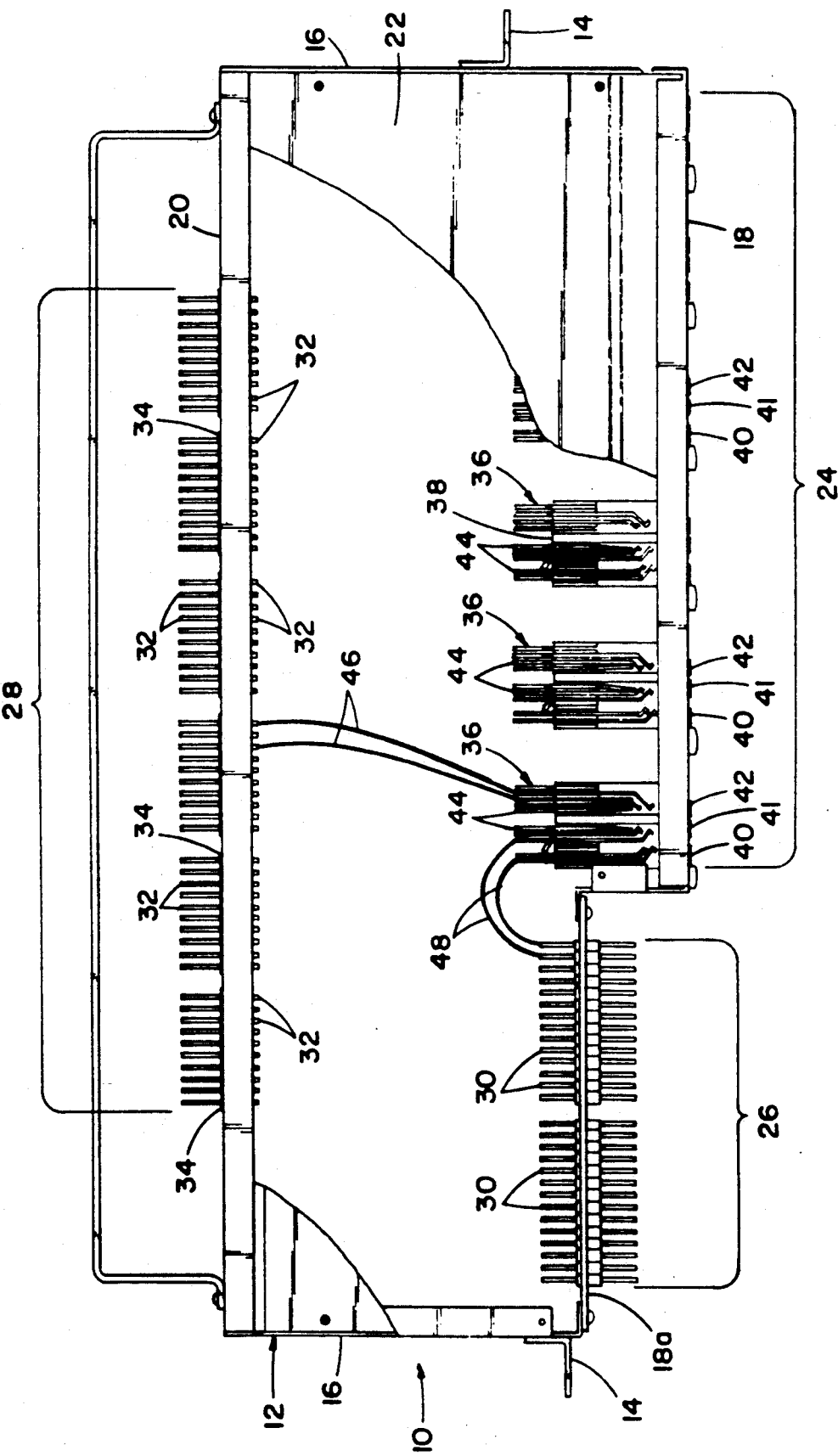
FIG. 2 is a top plan view, partially exposed, of the module of FIG. 1.

The module 10 includes a jack field 24, a crossconnect field 26 and an equipment-connect field 28. As shown in the aforementioned ADC product literature, it is common for DSX modules to have fields such as jack field 24, cross-connect field 26 and equipment-connect field 28. Commonly, DSX modules are provided in two options, namely the cross-connect field 26 may be placed on the front of the module (as shown in FIGS. 1 and 2). Alternately, the cross-connect field 26 may be placed on the rear of the module.

As is customary, the cross-connect field 26 includes a plurality of wire wrap termination pins 30 mounted into the forward wall 18 for exposure through the forward wall. As shown in FIG. 2, the forward wall includes recessed portion 18a such that the pins 30 do not extend completely past the outer forward dimension of the module 10. Similarly, the equipment-connect field 28 includes a plurality of wire wrap termination pins 32 which are received within dielectric blocks 34. The blocks group the pins 32 in a desired array. The blocks 34 are mounted on the rear wall 20 of the module 10.

It will be appreciated that cross-connect modules having cross-connect fields, equipment-connect fields and wire wrap termination pins as thus described, are well known in the art and form no part of this invention per se.

Figure 4:
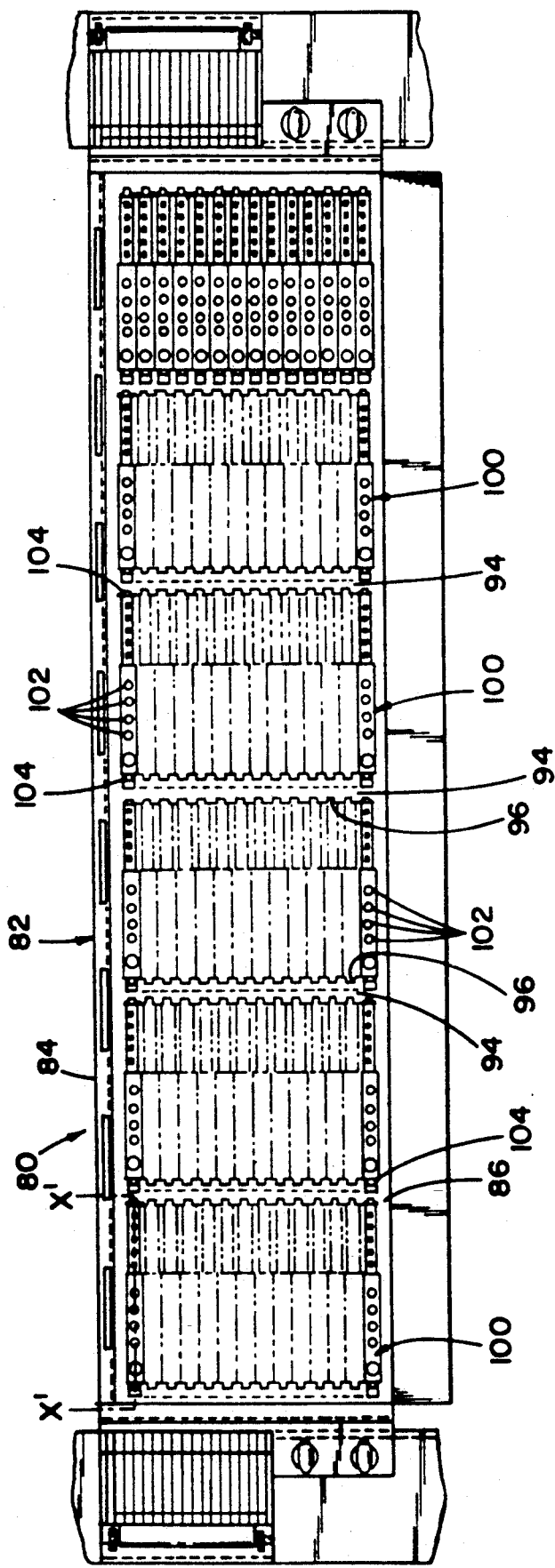
FIG. 4 is a front elevation view of a second embodiment of the module of FIG. 1.

The jack field 24 includes a plurality of bantam jacks 36. The bantam jacks 36 include a frame 38 having a plurality of plug receiving sleeves including a monitor (or MON) sleeve 40, an OUT sleeve 41 and an IN sleeve 42. The jack also includes a plurality of spring contacts 44 which are carried on the frame 38 and disposed to be selectively contacted by a jack plug (not shown) inserted within any of sleeves 40–42. It will be appreciated that bantam jacks having frames, sleeves and contact springs are well known in the art. Examples of such are shown in FIGS. 4 and 5 of the aforementioned U.S. Pat. No. 4,975,087. Selective ones of the springs 44 are connected by conductors 46 to pins 32 on the equipment connect field 28. Selected others of the springs 44 are connected by conductors 48 to the pins 30 on the cross-connect field 26.

The bantam jacks 36 are carried on dielectric blocks 50. It will be appreciated that mounting bantam jacks to dielectric blocks is well known in the art and is shown in the aforementioned ADC publications.

In the embodiment of the present invention, six blocks 50-55 are shown each having 14 bantam jacks per block. On the blocks 50-55, the bantam jacks 36 are arranged in side-by-side alignment. An axis of alignment X—X is defined by the aligned sleeves 40-4-2. The axes X—X of alignment of each of the bantam jacks 36 are parallel and spaced apart on each block 50-55. Further, the bantam jacks are aligned such that the sleeves 40, sleeves 41 and sleeves 42 of all jacks 36 on a block 50-55 are in alignment with a vertical axis Y—Y.

As shown on FIG. 1, the blocks 50-55 are connected to the forward wall 18 such that a longitudinal dimension of the blocks 50-55 is vertical. More specifically, the blocks are aligned such that the axis X—X of a given jack is horizontal and all jacks within a block (such as block 50) are stacked in a vertical column.

Surprisingly, Applicant has found that stacking the jacks 36 in a plurality of vertical columns permits a higher density of jacks per module 10. Specifically, the present invention permits 84 jacks to be positioned on a single module 10 having exterior dimensions which, historically, would permit only 60 jacks if disposed with their axis X—X in a vertical alignment. As a result, the present invention increases the density to an amount sufficient such that the number of jacks on the module may be a multiple of a predetermined number of jacks necessary for a given piece of equipment. Namely, for equipment requiring 28 jacks, as is common in the telecommunications industry, the present module 10 permits three pieces of equipment to be terminated on a single module. With the prior art, three pieces of equipment required a complete module and a fraction of a second module for termination.

FIGS. 4 and 5 show an alternative embodiment of the present invention. FIGS. 4 and 5 are for use with a modular jack assembly such as that shown in U.S. Pat. No. 4,840,568 and marketed by ADC under the name PIX DSX. Through reference, Applicants incorporate herein the drawings and specification of U.S. Pat. No. 4,840,568.

FIGS. 4 and 5 show a module 80 mounted to the upright supports 82 (see FIG. 5) of a chassis. The module 80 includes a housing 82 having a top wall 84, bottom wall 86, rear wall 88 and side walls 90. Mounting brackets 92 are mounted on the side walls 90 to permit attachment to the uprights 82.

A plurality of vertical interior dividing walls 94 extend between the top wall 84 and the bottom wall 86. The vertical dividing walls 94 have a plurality of grooves 96 formed therein to receive the rails 104 of a plurality of jack assemblies 100.

Each of jack assemblies 100 is identical and is such as that shown and described in the aforementioned U.S. Pat. No. 4,840,568 (the teachings of which are incorporated herein by reference). The jack assemblies 100 include a plurality of aligned plug receiving ports 102. The jack assemblies are provided with rails 104 sized to be received within grooves 96. The grooves are positioned such that the ports 102 of a jack assembly 100 are disposed in alignment along horizontal axis X'—X' when the jack assembly 100 is slidably received within the grooves 96. Each of the jack assemblies 100 includes a plurality of spring contacts (as shown in the aforementioned U.S. Pat. No. 4,840,568) arranged in a DSX format. A rear edge 108 of each jack assembly 100 is provided with connector ends which are received within connectors (not shown) carried on the frame 81. Connectors for receiving a leading edge 108 are shown in the aforementioned U.S. Pat. No. 4,840,568.

It has been shown how the objects of the invention have been attained in a preferred manner. Modifications and equivalents of the disclosed such as those which readily occur to one skilled in the art are intended to be included within the scope of this invention. Accordingly, the scope of this invention is intended to be limited only by the scope of the claims which are appended hereto.

What is claimed is:

1. A high density digital signal cross-connect module, comprising:
   a housing having a forward wall;
   a plurality of jacks, each of said jacks having at least first and second spaced apart jack plug receiving sleeves, said jacks further including a plurality of spring contacts disposed to be engaged by a plug inserted into either of said first and second sleeves;
   mounting means for mounting said plurality of jacks within said housing with said jacks disposed for said sleeves to be exposed through said forward wall and with said jacks further disposed for said first and second sleeves of any given jack to be in alignment with a generally horizontal axis.

2. A digital signal cross-connect module according to claim 1 wherein said housing includes first and second spaced apart side walls with said forward wall extending between said side walls to define a transverse dimension between said side walls, said horizontal alignment generally parallel with said transverse dimension.

3. A digital signal cross-connect module according to claim 1 wherein said module is incorporated into a telecommunication system having associated equipment requiring connections to a predetermined number of jacks, said plurality of jacks within a module including a multiple of said predetermined number.

4. A digital signal cross-connect module according to claim 1 wherein said plurality of jacks includes at least a first group, said jacks within said first group disposed in a generally vertical column with first sleeves of said jacks within said first group disposed in generally vertical alignment and with second sleeves of jacks within said first group disposed in generally vertical alignment.

5. A digital signal cross-connect module according to claim 4 comprising a plurality of groups including said first group with jacks of each of said groups disposed in a generally vertical column.

6. A digital signal cross-connect module according to claim 4 wherein said mounting means is a dielectric block, said jacks within said group connected to said block, said forward wall having an opening defined therein sized to receive said block, said block disposed within said opening.

7. A digital signal cross-connect module according to claim 4 wherein said group extends substantially an entire vertical dimension of said forward wall.

8. A digital signal cross-connect module according to claim 1 wherein said plurality of spring contacts includes a first set and a second set;

a first plurality of wire termination means for terminating a wire;

a second plurality of wire termination means for terminating a wire;

said first plurality of wire termination means electrically connected to said first set and said second plurality of wire termination means electrically connected to said second set.

9. A digital signal cross-connect module according to claim 8 wherein said housing includes a rear wall and wherein said first plurality of wire termination means is a cross-connect field, said cross-connect field disposed on said rear wall.

10. A digital signal cross-connect module according to claim 8 wherein said first plurality of wire termination means is a cross-connect field, means for mounting said cross-connect field on said forward wall with said first plurality of wire termination means exposed.

11. A digital signal cross-connect module according to claim 10 wherein said plurality of jacks is a jack field, said cross-connect field disposed on said forward wall in side-by-side relation to said jack field.

12. A digital signal cross-connect module according to claim 10 wherein said second plurality of wire termination means is an equipment connection field, said equipment connection field disposed on said rear wall.

* * * * *